United States Patent
Steverding et al.

(10) Patent No.: US 8,230,942 B2
(45) Date of Patent: *Jul. 31, 2012

(54) POWER TOOL WITH IMPROVED START ACTUATOR

(75) Inventors: James F. Steverding, Mentor, OH (US); Glen A. Pankey, Waterford, MI (US); Duane R. Bookshar, Highland Heights, OH (US)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/938,083

(22) Filed: Nov. 2, 2010

(65) Prior Publication Data

US 2011/0042114 A1    Feb. 24, 2011

Related U.S. Application Data

(63) Continuation of application No. 11/612,714, filed on Dec. 19, 2006, now Pat. No. 7,836,968.

(60) Provisional application No. 60/785,380, filed on Mar. 24, 2006.

(51) Int. Cl.
  *E21B 44/02* (2006.01)
(52) U.S. Cl. ................................. 173/2; 173/1
(58) Field of Classification Search ............. 173/1, 2, 173/4, 5; 81/57.13, 57.14
  See application file for complete search history.

(56) References Cited

U.S. PATENT DOCUMENTS

| | | |
|---|---|---|
| 2,793,305 A | 5/1957 | Gerentes |
| 3,257,877 A | 6/1966 | Ulrich et al. |
| 3,535,960 A | 10/1970 | Borries |
| 3,802,518 A | 4/1974 | Albert |
| 3,987,692 A | 10/1976 | Lesner |
| 3,995,477 A | 12/1976 | Almond |
| 4,064,772 A | 12/1977 | Boyd |
| 4,231,270 A | 11/1980 | Totsu |

(Continued)

FOREIGN PATENT DOCUMENTS

DE    19617882    11/1997

(Continued)

OTHER PUBLICATIONS

International Search Report dated Nov. 7, 2007 for corresponding pending PCT Appln. No. PCT/US2007/064777.

*Primary Examiner* — Paul R Durand
*Assistant Examiner* — Nathaniel Chukwurah
(74) *Attorney, Agent, or Firm* — Pillsbury Winthrop Shaw Pittman LLP

(57) ABSTRACT

A power tool system includes a two-handed power tool having first and second start actuators, one for each hand of an operator. A controller prevents the power tool from initiating an operating cycle unless both actuators are turned ON to reduce the possibility of the operator's hands being disposed in a hazardous position during operation of the power tool. To discourage manual override of the dual-start-switch system, the controller prevents the power tool from initiating an additional operating cycle until both actuators have been switched OFF and then ON again. The second actuator includes a tubular sleeve that extends over part of the power tool to allow the sleeve to slide axially relative to the power tool between ON and OFF positions. Axial movement of the sleeve from its OFF position to its ON position turns ON the second start actuator.

5 Claims, 2 Drawing Sheets

U.S. PATENT DOCUMENTS

| | | | |
|---|---|---|---|
| 4,317,578 A | 3/1982 | Welch | |
| 4,449,062 A | 5/1984 | Wilson | |
| 4,449,063 A * | 5/1984 | Ohmichi et al. | 326/20 |
| 4,493,377 A | 1/1985 | Günther | |
| 4,808,862 A | 2/1989 | Carvalho et al. | |
| 5,251,706 A | 10/1993 | Evans | |
| 5,583,386 A | 12/1996 | Meixner | |
| 5,636,698 A | 6/1997 | Estep | |
| 5,701,961 A | 12/1997 | Warner | |
| 6,093,915 A | 7/2000 | Postlewait | |
| 6,523,442 B2 | 2/2003 | Lehnert et al. | |
| 6,559,613 B1 | 5/2003 | Elliott | |
| 6,662,882 B2 | 12/2003 | Hansson | |
| 6,796,385 B1 | 9/2004 | Cobzaru | |
| 6,799,643 B2 | 10/2004 | Voulkidis | |
| 6,890,135 B2 | 5/2005 | Kopras | |
| 6,923,268 B2 | 8/2005 | Totsu | |
| 7,090,030 B2 | 8/2006 | Miller | |
| 7,836,968 B2 * | 11/2010 | Steverding et al. | 173/1 |
| 2004/0040727 A1 | 3/2004 | Miller | |
| 2005/0161241 A1 | 7/2005 | Frauhammer | |
| 2007/0114049 A1 | 5/2007 | Steverding et al. | |

FOREIGN PATENT DOCUMENTS

| | | |
|---|---|---|
| EP | 0 052 185 | 5/1982 |
| GB | 2 185 209 | 7/1987 |

* cited by examiner

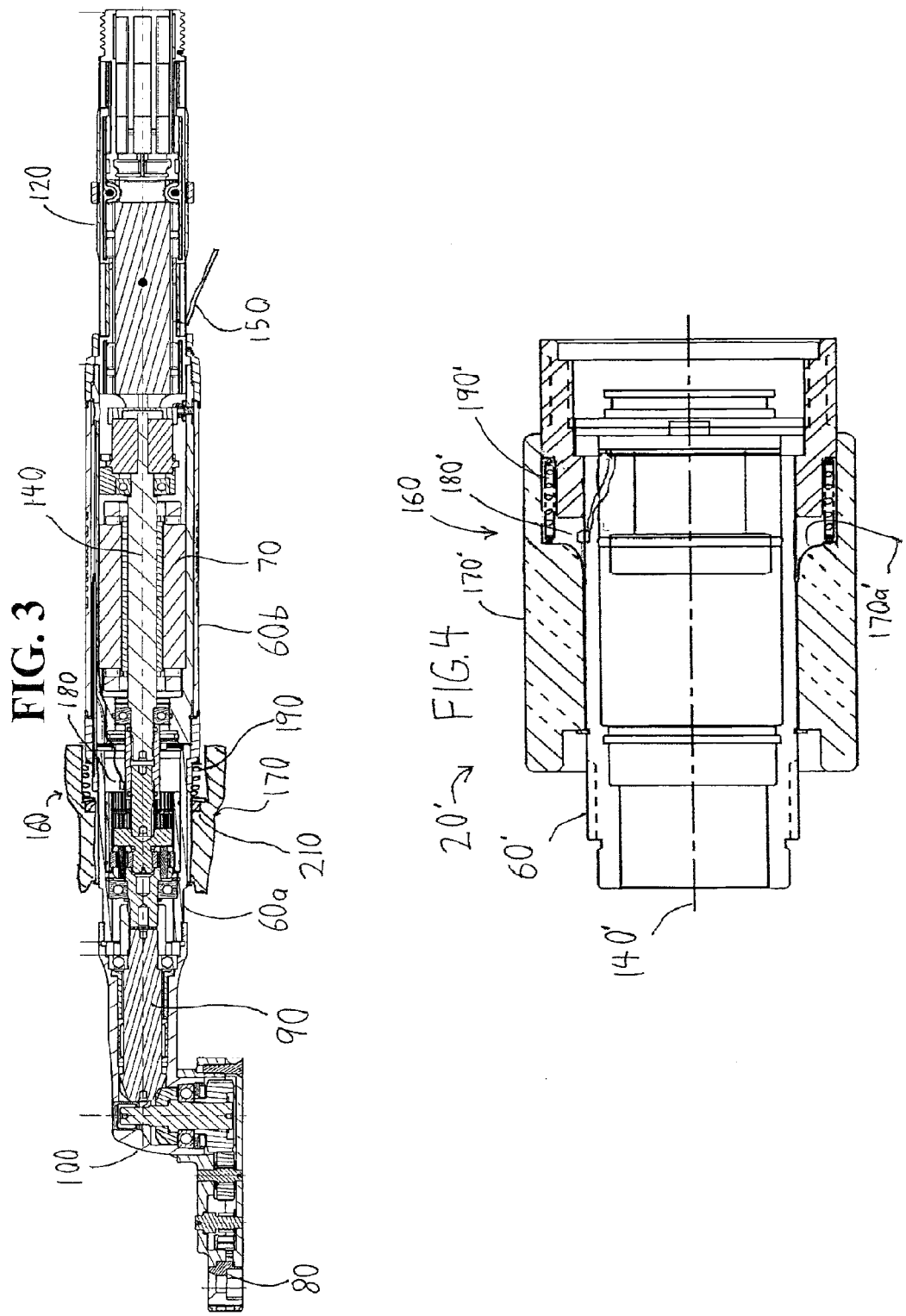

POWER TOOL WITH IMPROVED START ACTUATOR

CROSS REFERENCE

This application is a continuation of U.S. patent application Ser. No. 11/612,714, filed Dec. 19, 2006, now U.S. Pat. No. 7,836,968 now allowed, which claims the benefit of priority from U.S. Provisional Application Ser. No. 60/785,380, filed Mar. 24, 2006, titled "Power Tool with Improved Start Actuator," the entire contents of each of the foregoing applications being hereby incorporated in their entirety by reference.

BACKGROUND OF THE INVENTION

1. Field of the Invention

This invention relates to start actuators for power tools such as power wrenches.

2. Description of Related Art

Hand-held powered assembly tools (e.g., straight, angle, crowfoot, open end, and/or pistol-grip power wrenches), typically include a motor (e.g., an electric or fluid-driven motor), an output drive connected to the motor via a drive train, and a manually operated start switch to initiate operation of the tool. The output drive (e.g., a socket or a square drive spindle adapted to engage a socket) is shaped to engage a further output drive (e.g., a socket) or a fastener to be tightened or loosened (e.g., nuts, bolts, screws, etc.).

Certain power tools can be so configured that there exists an operator hazard should the operator inadvertently place his hands near a potential pinch point. Several types of tool configurations present such hazards which, if guarded, would prevent the tool from being used for its intended purpose. One example of such a tool is an open-end wrench as described in U.S. Pat. No. 4,064,772. See also U.S. Pat. Nos. 3,257,877, 3,535,960, 3,636,698, 3,987,692, and 6,559,613. Open-end wrenches (sometimes referred to as tubenut wrenches) have a radially-extending opening in their housing through which a fastener may extend. The rotatable output drive also has a radially extending opening. When the openings in the housing and output drive are aligned, a fastener may be inserted through the openings into engagement with the output drive. As the output drive rotates within its housing to tighten or loosen the fastener, a pinch point is created as the opening in the output drive moves past the opening in the housing. Unfortunately, positioning a guard in the vicinity of the output drive might interfere with the tool's ability to reach the fastener to be tightened.

Tools that present such pinch points or other hazards are typically equipped with start actuators that require two separate motions to move to the start position. Such multi-step start actuators reduce the likelihood of unintentionally starting the tool, but do not prevent an operator's free second hand from coming in contact with a pinch point or hazard.

Tools can be equipped with dual start actuators that include a start actuator for each of the operator's hands. The two actuators are connected in series such that both actuators must be actuated in order for the tool to operate, thereby reducing the likelihood that the operator's hands are within reach of a pinch point or hazard. However, the restrictive positioning and inconvenient actuation of the secondary actuator typically hinders the normal operation of the tool as it is manipulated into position onto fasteners in a variety of positions. In such cases an operator may choose to defeat the intended safety function of the secondary start actuator by mechanically restraining it in its ON position.

In addition, when a secondary start actuator is positioned at a preferred location on the body of the tool, the physical size of typical commercially available electrical switches adds considerable size and weight to the hand-held assembly tool, placing an ergonomic burden on the operator. It is also often difficult and costly to route the electrical wires to the electrical switch associated with this secondary start actuator in a manner that prevents their damage when used in an industrial environment, thereby adding considerable cost and complicating any future maintenance of the tool.

In the machine control art, it is known to use "two-hand-no-tie-down" start actuators for stationary machines (e.g., metal punch presses) where the operator must use both hands to actuate two start actuators within a short time period of each other (e.g., ½ second) to start the cycle. Requiring both start actuators to be actuated within a short time period discourages an operator from mechanically fixing one start actuator into its ON position. The "two-hand-no-tie-down" system is used for stationary, floor mounted machines in which an operator's hands are not used to hold the machine or the work piece during operation. Accordingly, the dual start actuators are used to ensure that the operator's two otherwise idle hands are safely positioned.

BRIEF SUMMARY OF THE INVENTION

Accordingly, one aspect of one or more embodiments of the present invention provides means to discourage the tool operator's hand from coming in contact with a potential hazard such as a pinch point or the intermittently exposed gear teeth of a rotating gear driven socket during the normal operation of the power tool.

Another aspect of one or more embodiments of the present invention provides a dual-start-actuator system that allows the tool operator to use a hand-held power tool in an efficient manner and that minimally interferes with the ability to manipulate the tool in order to perform its intended operation.

Another aspect of one or more embodiments of the present invention provides a dual-start-actuator system that discourages the operator from intentionally defeating the intended purpose of the dual start actuators by mechanically fixing either actuator into its ON position.

Another aspect of one or more embodiments of the present invention provides a primary or secondary start actuator that is more convenient to actuate in a variety of power tool orientations.

Another aspect of one or more embodiments of the present invention provides a power tool with an improved dual start actuator system that is simple and inexpensive to manufacture, but is nonetheless robust enough to be conveniently implemented onto a variety of power tools.

Another aspect of one or more embodiments of the present invention provides a power tool system that includes a power tool having a start switch with ON and OFF states, and a tubular sleeve. A portion of the power tool extends through the tubular sleeve. The tubular sleeve is movable along an axis relative to the power tool between first and second positions. Axial movement of the tubular sleeve from its first to its second position places the start switch into its ON state. The tubular sleeve may be rotatable relative to the power tool. The start switch may be magnetically or physically actuated by axial movement of the sleeve toward the start switch.

Another aspect of one or more embodiments of the present invention provides a power tool system that includes a hand-held power tool having first and second start switches, each of the switches having ON and OFF states. The system also includes a controller operatively connected to the power tool and the first and second switches. The controller is constructed to initiate a first operating cycle of the power tool only after both switches are positioned in their ON states. The controller is constructed so as not to initiate a second operating cycle until each switch is switched into its OFF state following the first operating cycle and then returned to its ON state.

Another aspect of one or more embodiments of the present invention provides a method of operating a hand-held power tool having first and second start switches, each of the switches having ON and OFF states. The method includes:

(a) initiating a first operating cycle of the power tool in response to both start switches being disposed in their ON states;

(b) completing the first operating cycle;

(c) preventing initiation of a second operating cycle of the power tool until after each switch has been turned OFF and then ON again; and (d) initiating a second operating cycle of the power tool in response to both start switches being disposed in their ON states.

Additional and/or alternative advantages and salient features of the invention will become apparent from the following detailed description, which, taken in conjunction with the annexed drawings and accompanying claims, disclose preferred embodiments of the invention.

BRIEF DESCRIPTION OF THE DRAWINGS

Referring now to the drawings which form a part of this original disclosure:

FIG. 3 is a cross-sectional view of the power tool in FIGS. 1 and 2; and

FIG. 4 is a partial cross-sectional view of a power tool according to an alternative embodiment of the present invention.

DETAILED DESCRIPTION OF EMBODIMENTS OF THE INVENTION

Figure 1:
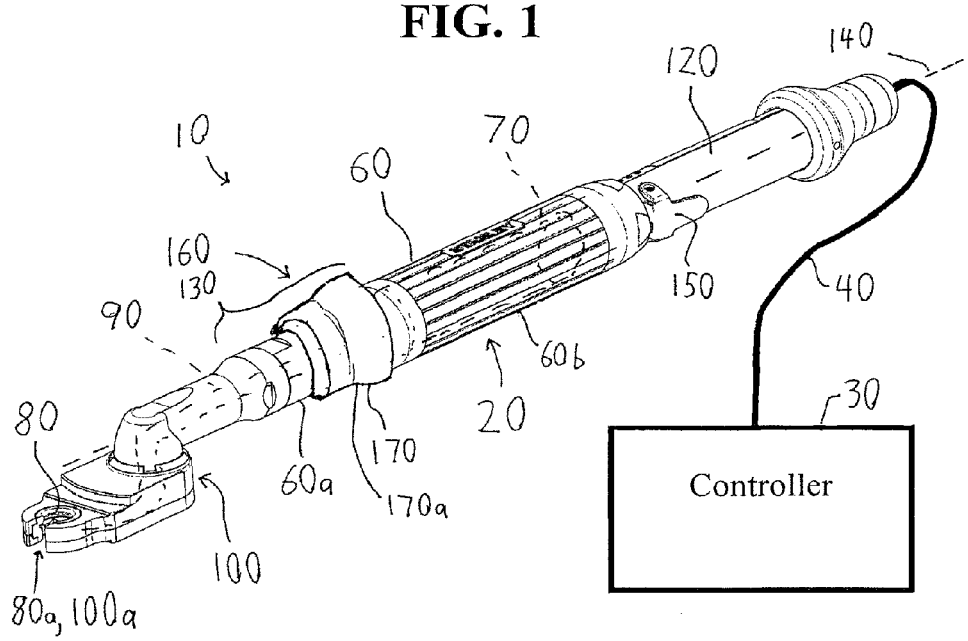
FIG. 1 is a perspective view of a power tool system according to an embodiment of the present invention.

FIG. 1 illustrates a power tool system 10 according to an embodiment of the present invention. The system 10 comprises a powered assembly tool 20, a controller 30, and a cable 40 operatively interconnecting the tool 20 and controller 30. In the illustrated embodiment, the controller 30 and tool 20 are separately housed. However, according to an alternative embodiment, the controller 30 is integrated into a housing 60 of the tool 20. Alternatively, some aspects of the controller 30 may be housed within the housing 60 while other aspects of the controller 30 may remain separately housed.

The illustrated tool 20 comprises an open-end nutrunner. However, the tool 20 may alternatively comprise any other type of hand-held, torque-applying, powered assembly tool (e.g., straight, angle, crowfoot, and/or pistol-grip power wrenches) or other hand-held power tool (e.g., drill, jigsaw, circular saw, router, etc.) without deviating from the scope of the present invention. Hand-held power tools include any type of power tool that relies on an operator's hands to position the tool during use, even if the tool is also supported by an additional means (e.g., a neutral buoyancy hoist that helps support heavier power tools). Furthermore, the tool 20 may comprise a non-hand-held power tool (e.g., floor- or machine-mounted tool) without deviating from the scope of the present invention.

The hand-held assembly tool 20 comprises a housing 60, an electrically-powered motor 70 supported by the housing 60, an output drive 80, and a drive train 90 that operatively connects the motor 70 to the output drive 80.

While the illustrated motor 70 comprises an electric motor, any other type of suitable motor may alternatively be used without deviating from the scope of the present invention (e.g., fluid-driven motor such as a hydraulic or pneumatic motor).

The illustrated output drive 80 comprises an open-ended, gear-driven socket output drive 80 for use in driving tube nuts. An operating head 100 houses the output drive 80 and a portion of the drive train 90. Gear teeth of the socket head 80 mesh with associated gear(s) of the drive train 90. The socket head 80 has a radial slot 80a, which may be aligned with a radial slot 100a in the operating head 100. When the radial slots 80a, 100a are aligned, the output drive 80 may be fitted over an elongated tube to allow the output drive 80 to engage a tubenut to be tightened or loosened.

While the illustrated output drive 80 comprises on open-end socket head, the output drive 80 may alternatively comprise any other suitable output drive, depending on the intended use of the tool 20, without deviating from the scope of the present invention (e.g., flat-head or Philips head bit, socket head, male or female hex-head, drill bit, drill chuck, square drive spindle, etc.).

Figure 2:
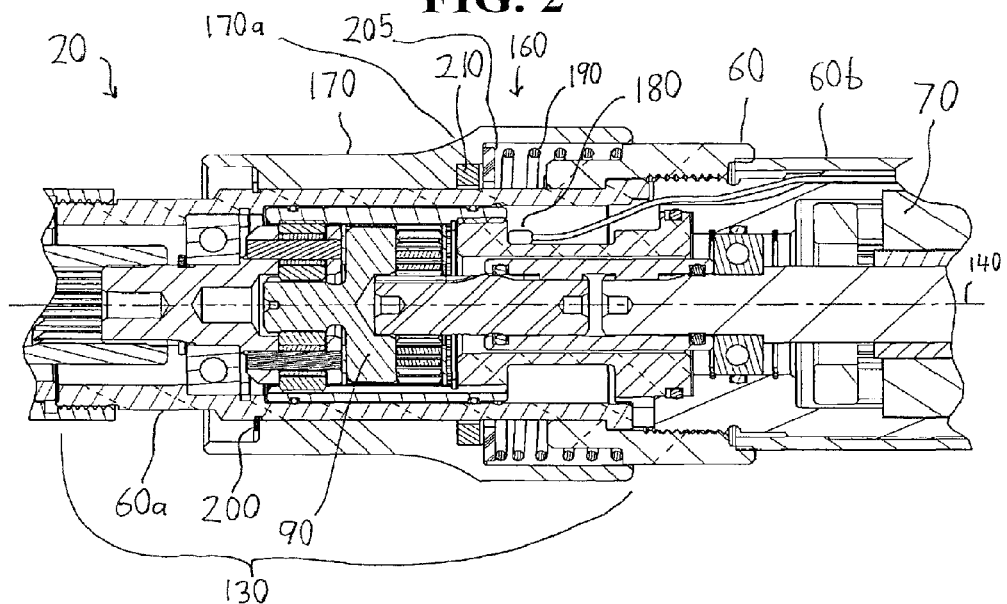
FIG. 2 is a partial cross-sectional view of a power tool of the system in FIG. 1.

As shown in FIGS. 2 and 3, the illustrated drive train 90 comprises a planetary gear transmission. However, the drive train 90 may additionally or alternatively comprise any other type of suitable drive train without deviating from the scope of the present invention (e.g., direct shaft connecting the motor to the output drive, etc.). The drive train 90 also includes a variety of gears (e.g., spur gears, bevel gears) to enable it to extend through the twists and turns of the operating head 100 from the motor 70 to the output drive 80. The axial orientation of the output drive 80 (e.g., straight, angle, crowfoot) may be accommodated by such gears. A transmission ratio of the drive train 90 may be designed to match the chosen motor 70 with the desired torque and speed at the output drive 80.

The tool 20 comprises a hand-held tool that includes primary and secondary handles 120, 130. As shown in FIG. 3, the primary handle 120 is disposed rearwardly of the motor 70 and motor housing 60b. The secondary handle 130 surrounds at least part of the drive train 90. The secondary handle 130 is defined by a gear transmission housing 60a and an outer surface of a sleeve 170, discussed below. The handles 120, 130 are generally cylindrically shaped and have axes that are coaxial with a longitudinal axis 140 of the tool 20.

A primary start actuator 150 is associated with the primary handle 120 and is disposed toward a rearward end of the tool 20. The primary start actuator 150 may comprise any suitable type of actuator (e.g., momentary switch, pressure sensor, etc.). The actuator 150 is normally in an OFF state, until an operator actuates the primary start actuator 150 to place it in an ON state.

A secondary start actuator 160 is associated with the secondary handle 130 and is disposed toward a forward end of the tool 20. As shown in FIG. 2, the secondary start actuator 160 comprises a tubular sleeve 170 and a switch 180. A portion of the tool 20, including the drive train 90 and a gear transmission housing 60a, extends through the tubular sleeve 170. According to an embodiment of the present invention, the portion of the tool 20 forward of the sleeve 170 connects to the portion of the tool 20 rearward of the sleeve 170 only by way of the opening within the sleeve 170.

The gear transmission housing 60a is generally cylindrically shaped. The tubular sleeve 170 is rotatable relative to the tool 20 about an axis of the sleeve 170, which is coaxial with the axis 140. The tubular sleeve 170 is longitudinally movable along the axis 140 relative to the tool 20 between first and second positions, the first position being illustrated in FIG. 2. A retaining ring 200 (or other detent mechanism such as a portion of the housing 60a) limits the axial movement of the sleeve 170 relative to the tool 20 in the direction of the operating head 100. A compression spring 190 and thrust bearing 205 extend in series between the housing 60 (or other part of the tool 20) and sleeve 170 to bias the sleeve 170 toward its first position. The thrust bearing 205 facilitates rotation of the sleeve 170 relative to the spring 190 and housing 60. The spring 190 and/or another portion of the housing 60 limits axial movement of the sleeve 170 toward the rearward end of the tool 20.

In the illustrated embodiment, the sleeve 170 is rotatable relative to the tool 20 and gear transmission housing 60a. Alternatively, the sleeve 170 and gear transmission housing 60a may be shaped to prevent such rotation while permitting relative axial movement (e.g., via complimentary square or hexagonal cross-sectional shapes; a splined keyway, etc.). Preventing rotation of the sleeve 170 may provide an operator with a more secure grip of the tool 20. Alternatively, allowing rotation of the sleeve 170 may make the actuator 160 more convenient to operate.

The sleeve 170 is preferably disposed far enough from anticipated pinch points or other hazards that actuation of the sleeve 170 by an operator keeps the operator's hand safely away from anticipated hazards. As shown in FIG. 2, the outer surface of the sleeve 170 may be contoured to accommodate the curvature of the operator's second hand or fingers. The outward surface of the sleeve 170 may flare radially outwardly to provide a rearward shoulder 170a that helps to minimize slipping of the operator's hand relative to the sleeve 170 in the direction of the rear end of the tool 20. The reduced diameter of the forward end of the outer surface of the sleeve 170 may provide a comfortable grip for the operator.

The sleeve 170 may be symmetrical around the axis 140, thereby allowing it to be conveniently operated by the operator's right or left hand. Alternatively, the sleeve 170 may include ergonomic surface features that are specifically designed to comfortably and securely accommodate a specific hand (i.e., right or left) of the operator.

The compression spring 190 may be replaced by any other suitable biasing mechanism without deviating from the scope of the present invention. For example, an elastic rubber member or repulsive magnets may be used to create the biasing force.

As illustrated in FIG. 2, the switch 180 comprises a normally-OFF magnetically actuated reed switch 180. Alternatively, the switch 180 may comprise any other type of suitable magnetic switch (e.g., a Hall effect switch) without deviating from the scope of the present invention. The switch 180 is actuated into its ON state by the presence of a magnetic field. The sleeve 170 comprises an annular magnet 210. The remainder of the sleeve 170 and portions of the tool 20 in the vicinity of the magnetic reed switch 180 may be non-ferrous so as to avoid interfering with the operation of the switch 180. The switch 180 is in its OFF state when the sleeve 170 is in its first position (illustrated in FIG. 2). When the sleeve 170 is slid into its second position (i.e., toward the switch 180), magnetic interaction between the magnet 210 and reed switch 180 actuates the switch 180 into its ON state.

The location of the magnetic switch 180 within the interior of the gear transmission housing 60a allows convenient routing of the interconnecting electrical wires entirely within the interior of the housing 60 of the tool 20, thereby minimizing any size or weight penalty while simultaneously simplifying the assembly and maintenance of the tool 20. The positioning of the switch 180 within the housing 60 may also reduce the risk of damage to the switch 180 or associated wiring when used in an industrial environment.

In operation, to actuate the secondary start actuator 160, an operator slides the tubular sleeve 170 from its first position against the force of the spring 190 into its second position, which positions the magnet 210 near the magnetic switch 180. In this position, the magnetic field of the ring magnet 210 causes the magnetic switch 180 to move to its ON state. The location, size, and direction of actuation of the sleeve 170 make the secondary start actuator 160 convenient to operate. Upon release of the sleeve 170, the spring 190 returns the sleeve to its first position, which returns the switch 180 to its OFF state.

The use of an annular ring-shaped magnet 210 enables the sleeve 170 to actuate the switch 180 regardless of the angular position of the tubular sleeve 170. Accordingly, the tubular sleeve 170 may be allowed to freely rotate relative to the gear transmission housing 60a without affecting the actuation of the magnetic switch 180, thus making the secondary start actuator 160 convenient to actuate in a variety of tool orientations. The annular magnet 210 may be replaced by a plurality of circumferentially spaced magnets without deviating from the scope of the present invention.

As shown in FIG. 3, the power tool 20 comprises a modular power tool with interchangeable, interconnected components. The primary handle 120 connects to the motor 70 and associated motor housing 60b. The motor 70 and motor housing 60b, in turn, connect to the drive train 90 and gear transmission housing 60a. The gear transmission housing 60a connects to the operating head 100, while the drive train 90 extends through the operating head 100 to the output drive 80. In the illustrated embodiment, the operating head 100 comprises a crowfoot open ended wrench, and the drive train 90 comprises suitable drive gears and components for transmitting power through the angles of the operating head 100. Alternatively, the operating head 100 may comprise any other suitable operating head without deviating from the scope of the present invention (e.g., straight drive, angle drive, etc.).

FIG. 4 illustrates an alternative secondary start actuator 160' according to an alternative embodiment of the present invention. The secondary start actuator 160' may replace the above-described start actuator 160 in the tool 20 without deviating from the scope of the present invention. In this embodiment, a tubular sleeve 170' includes a sloped cam surface 170a'. A physically actuatable, normally OFF switch 180' mounts to and extends out of a housing 60' of the tool 20'. The switch 180' may comprise any type of suitable physically actuatable switch (e.g., momentary switch that is biased toward an OFF state, etc.). Sliding movement of the sleeve 170' from a first position (shown in FIG. 4) into a second position (toward the right as shown in FIG. 4) causes the cam surface 170a' to contact and actuate the switch 180' to switch the switch 180' from its OFF state to its ON state. A spring 190' biases the sleeve 170' toward its first position so as to turn the switch 180' OFF when an operator releases the sleeve 170'.

While specific primary and secondary start actuators 150, 160, 160' are described, any other type of suitable start actuators may be used in connection with the tool 20 without deviating from the scope of the present invention. Moreover, one or the other of the start actuators may be omitted without deviating from the scope of the present invention.

The controller 30 controls the motor 70. Various sensors (e.g. output drive torque sensor, output drive rotational position sensor, output drive acceleration sensor, etc.) within the hand-held tool 20 are monitored by the controller 30 and various control algorithms are used to control each operating cycle of the tool 20. In a typical threaded fastener operating cycle, the controller 30 runs the motor 70 until a pre-selected torque level is reached at the output drive 80, at which point the controller 30 stops running the motor 70. The operating cycle control algorithm may include controls that facilitate the removal of the tool 20 from the fastener (e.g., realigning the slots 80a, 100a in an open-end nutrunner 20 to enable the nutrunner 20 to disengage a tubenut or other fastener).

The primary and secondary start actuators 150, 160 operatively connect to the controller 30. The controller 30 includes a digital signal processor having embedded logical functions to allow the tool 20 to initiate a fastening (or loosening) cycle only after both start actuators 150, 160 are moved into their ON states. The ON states of the actuators 150, 160 may correspond to open or closed circuits, depending on the logic used by the controller 30. The controller 30 stops the tool 20 if either start actuator 150, 160 moves to its OFF state at any time during the operating cycle. The controller 30 thereby reduces the likelihood that the tool 20 will injure an operator who has released one of his hands from the tool 20 and possibly placed his free hand in a pinch point or other hazard. In a normal operating cycle, where both start actuators 150, 160 are held in their ON position throughout the operating cycle, the tool will stop when a pre-selected torque level is reached.

The controller 30 includes a mechanical-override deterrent system. The logical function embedded within the digital signal processor of the controller 30 requires that following a normal operating cycle, both start actuators 150, 160 must return to their OFF position, before a subsequent operating cycle may be initiated by moving both actuators 150, 160 to their ON positions. Such logic discourages mechanically overriding the safety system, which is otherwise possible in a two-hand-operated dual start actuator system in which the two start actuators simply connect in series. Should either start actuator 150, 160 be mechanically restrained in its ON position, that start actuator 150, 160 would be prevented from moving to its OFF position thereby preventing the start of a second operating cycle, and thereby reducing the likelihood that an operator would defeat the intended function of the secondary start actuator.

The above-described mechanical override deterrent system operates on an operating cycle basis to prevent subsequent operating cycles from being initiated until after both actuators 150, 160 have been turned OFF. Within a single operating cycle, the controller 30 allows the cycle to be continued after one actuator 150, 160 is turned OFF and then ON again, even if the other actuator 150, 160 was not turned OFF. Thus, an operator can interrupt and then continue an operating cycle without turning both actuators 150, 160 OFF.

The processor of the controller 30 may additionally or alternatively require that both actuators 150, 160 be switched from their OFF states to their ON states within a predetermined time period before initiating an operating cycle. According to one embodiment, the time period is about ½ second. The controller 30 may include an adjustable/programmable time period (e.g., 1/10 second increments) to accommodate different operating environments. Within a given operating cycle that involves several fastening operations (e.g., a plurality of circumferentially spaced lug nuts for a hub), the controller 30 may suspend the time period requirement such that the operator may turn OFF and ON just one of the actuators 150, 160 between individual fastening operations within the operating cycle to turn the tool 20 on and off. However, to initiate an additional operating cycle, the controller 30 may again require that both actuators 150, 160 be switched from their OFF states to their ON states within the predetermined time period.

According to an alternative embodiment of the present invention, the mechanical override deterrent system operates on an intra-operating-cycle basis. Accordingly, any time one of the actuators 150, 160 is turned OFF during an operating cycle, both actuators 150, 160 must be turned OFF before the interrupted operating cycle or any subsequent operating cycle may proceed. The above-described time-period-requirement may also operate on an intra-operating-cycle basis to require that both actuators 150, 160 be switched from their OFF to their ON states to operate the tool 20 any time one of the actuators 150, 160 is switched OFF.

To discourage single hand operation of both actuators 150, 160, the operator-actuatable portions of the actuators 150, 160 are preferably spaced from each other by a distance sufficient to discourage the single hand operation of both actuators 150, 160. According to various embodiments of the present invention, the operator-actuatable portions of the actuators 150, 160 are spaced from each other by at least two inches, at least three inches, at least four inches, at least five inches, at least six inches, or at least seven inches.

The illustrated actuators 150, 160 utilize two states: ON and OFF. However, the actuators 150 and/or 160 may additionally include additional intermediate states to facilitate, for example, proportional torque or speed control. Additional states may also facilitate initiation of alternative operating cycles (e.g., reverse, etc.).

According to an alternative embodiment of the present invention, the primary start actuator 150 is omitted, and the controller 30 comprises a direct circuit between the motor 70, the secondary start actuator 160, and a power source (e.g., electricity, compressed air, pressurized hydraulic fluid, etc.). Accordingly, turning ON the secondary start actuator 160 turns on the motor 70, and turning OFF the secondary start actuator turns OFF the motor 70.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. A power tool system comprising:
a hand-held power tool having first and second start switches, each of the switches having ON and OFF states;
a motor; and
a controller operatively connected to the power tool and the first and second switches, the controller being constructed to initiate a first operating cycle of the power tool only after both switches are positioned in their ON states, the controller being constructed so as not to initiate a second operating cycle until each switch is switched into its OFF state following the first operating cycle and then returned to its ON state,
wherein the controller is constructed to halt a current operating cycle if the first start switch is switched to its OFF state, wherein the controller is constructed to restart the current operating cycle after halting the current operating cycle if both switches are in their ON state, regardless of whether the second start switch was switched to its OFF state after the current operating cycle was halted, wherein the first start switch prevents the motor from running when the first start switch is in the first start switch's OFF state and the second start switch is in the second start switch's ON state, and wherein the second start switch prevents the motor from running when the second start switch is in the second start switch's OFF state and the first start switch is in the first start switch's ON state.

2. The system of claim 1, wherein the controller is constructed to prevent initiation of the second operating cycle until each switch is switched into its OFF state following the first operating cycle and then returned to its ON state.

3. A power tool system comprising:

a hand-held power tool having first and second start switches, each of the switches having ON and OFF states;

a motor; and a controller operatively connected to the power tool and the first and second switches, the controller being constructed to initiate a first operating cycle of the power tool only after both switches are positioned in their ON states, the controller being constructed so as not to initiate a second operating cycle until each switch is switched into its OFF state following the first operating cycle and then returned to its ON state, wherein the controller is constructed to halt a current operating cycle if the first start switch is switched to its OFF state, wherein the controller is constructed to restart the current operating cycle after halting the current operating cycle only after the second switch is turned OFF following the halting of the current operating cycle, wherein the first start switch prevents the motor from running when the first start switch is in the first start switch's OFF state and the second start switch is in the second start switch's ON state, and wherein the second start switch prevents the motor from running when the second start switch is the second start switch's OFF state and the first start switch is in the first start switch's ON state.

4. The system of claim 3, wherein the controller is constructed to prevent initiation of the second operating cycle until each switch is switched into its OFF state following the first operating cycle and then returned to its ON state.

5. The system of claim 3, wherein the controller is constructed to prevent the restarting of the current operating cycle after halting the current operating cycle until the second switch is turned OFF following the halting of the current operating cycle and then turned back ON.

* * * * *